US006646543B1

(12) United States Patent
Mardinian et al.

(10) Patent No.: US 6,646,543 B1
(45) Date of Patent: Nov. 11, 2003

(54) METHOD FOR MANAGING COLLISIONS IN A CONTACTLESS DATA EXCHANGING SYSTEM

(75) Inventors: Grégory Mardinian, Montmorency (FR); Francois Grieu, Paris (FR)

(73) Assignee: Regie Autonome des Transports Parisiens, Paris (FR)

( * ) Notice: Subject to any disclaimer, the term of this patent is extended or adjusted under 35 U.S.C. 154(b) by 0 days.

(21) Appl. No.: 09/380,486

(22) PCT Filed: Jan. 26, 1998

(86) PCT No.: PCT/FR98/00132

§ 371 (c)(1),
(2), (4) Date: Nov. 22, 1999

(87) PCT Pub. No.: WO98/39725

PCT Pub. Date: Sep. 11, 1998

(30) Foreign Application Priority Data

Mar. 3, 1997 (FR) .............................................. 97 02501

(51) Int. Cl.[7] ................................................ H04Q 5/22

(52) U.S. Cl. .................. 340/10.2; 340/10.4; 340/572.2; 340/572.4; 340/10.32

(58) Field of Search ................................ 340/572, 10.2, 340/10.3, 10.32, 10.4, 10.41, 572.4, 572.2

(56) References Cited

U.S. PATENT DOCUMENTS 5,266,925 A    11/1993   Vercellotti et al.
5,619,530 A  *  4/1997   Cadd et al. .................. 375/219

FOREIGN PATENT DOCUMENTS

| EP | 0 553 905 | 8/1993 |
| FR | 2 736 449 | 1/1997 |
| GB | 0553905 A1 * | 4/1993 |
| WO | WO 89/05549 | 6/1989 |

* cited by examiner

Primary Examiner—Julie Lieu
(74) Attorney, Agent, or Firm—Nixon & Vanderhye, P.C.

(57) ABSTRACT

A method handles collisions in a data interchange between portable objects and at least one data transceiver. The method includes the steps of the transceiver transmitting to said plurality of portable objects general call messages, each including a collision probability modulation parameter. Each portable object conditionally transmits to the transceiver a general call response with a probability of less than 100% as a function of the collision probability modulation parameter and having a specific identifier. The transceiver receives a general call response message, and in the absence of any collision between said message and a message transmitted by another portable object, a specific data communication link is established. Otherwise the method returns to the first step and repeats, optionally modifying the dynamic range of the probability modulation parameter.

28 Claims, 4 Drawing Sheets

COLLISION MANAGEMENT BY TERMINAL

METHOD FOR MANAGING COLLISIONS IN A CONTACTLESS DATA EXCHANGING SYSTEM

FIELD

The invention relates to contactless communication between a portable object and a terminal.

BACKGROUND

Interchanging data without contact is well known; the applications of this technique include, in a non-limiting manner, controlling access and remote payment, e.g. access to and payment for public transport.

Figure 4:
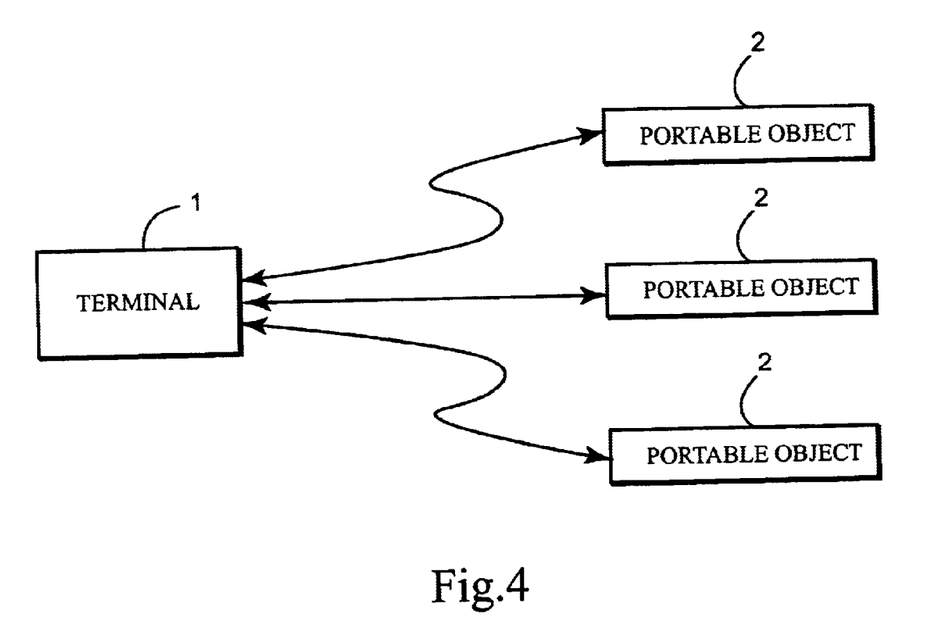
FIG. 4 shows a contactless communication system.

As shown in the example contactless communication system 1 in FIG. 4, each user is provided with a portable object 2 of the "contactless card" or "contactless badge" type which is an object capable of interchanging information with a fixed "terminal" 3 by bringing the badge close to the terminal so as to enable non-metallic mutual coupling to be established there between (with the term "terminal" by bringing the badge close to the terminal so as to enable non-metallic mutual coupling to be established there between (with the term "terminal" being commonly used to designate a data transceiver suitable for cooperating with portable objects).

SUMMARY

The invention relates to the particular situation in which a plurality of badges can be present simultaneously in the field of action of the terminal, and where there are no physical means, e.g. insertion into a slot, for isolating the arrival of a single object in the field.

Given that the signals transmitted by the various badges can overlap one another in time, the terminal must be provided with an "anti-collision" mechanism enabling it to detect such situations and to handle them so as to cause signals to be retransmitted by the badges.

Various algorithms have been proposed for this purpose. For example, European Patent Application No. 0 669 592 is based on accurate synchronization of the responses from badges that are present simultaneously in the field of action of the terminal. However, that requires the ability to achieve such synchronization, i.e. to cause all of the badges to transmit a signal at the same time in response to an interrogation message transmitted by the terminal. In practice, that technique requires a response mechanism to be integrated in each badge in the form of hard-wired logic.

It is not always possible to obtain such synchronization, particularly when using microprocessor badges which have response times that are not predictable with sufficient accuracy to be able to obtain the necessary degree of synchronization.

Under such circumstances, proposals have been made, e.g. in French Patent Application No. 2 666 187 A, to define a frame having a relatively large number of slots, with the response from the badge being transmitted asynchronously during a slot whose position within the frame is determined by selecting a random or pseudo-random number for each transmission. That technique solves the problem of lack of synchronization between badges and greatly reduces the probability of collision, with the probability decreasing with increasing number of time slots per frame.

Nevertheless, to be effective, that technique suffers from the drawback of requiring frames that are relatively long, given that the frames must have a large number of time slots, and that in addition the time slots must themselves be sufficiently large to enable all of the requisite information to be transmitted, particularly the complete identification number of the badge. This gives rise to a large and systemic increase in the duration of a transaction, and this applies independently of the number of badges actually present in the field of action of the terminal (since the duration of the frame is independent of the number, and is just as long in the most frequent case of only one badge being present as it is in the case of a large number of badges being present).

European Patent Application No. 0 702 324 A proposes another mechanism for handling collisions which provides that if a collision is detected, then the terminal sends a collision warning to the badge; on receiving this warning, each badge decides whether or not to send a message in reply, with the decision being random in nature and having a fixed probability of response, e.g. 50%. The number of responses received by the terminal, and consequently the risk of collision, is thus reduced after a first collision has been detected. If one or more collisions are still detected, the mechanism is reiterated until collisions have completely disappeared.

With such a mechanism, particularly when many badges are present in the field of action of the terminal, it will be understood that collisions can reoccur several times over and the number of reiterations can be large, thereby giving rise to a corresponding increase in the time required to identify all of the badges present.

One of the objects of the invention is to solve those various difficulties by proposing an asynchronous type of mechanism for handling collisions, i.e. a mechanism that is entirely suitable for use with microprocessor badges, which mechanism can easily be matched to the average number of badges actually or potentially present in the field of action of the terminal.

It is explained below that this adaptive matching under the control of the terminal can be static or dynamic. Static matching includes setting the terminal a priori to optimize the duration of the anti-collision algorithm as a function of the mean number of badges most likely to be found in the field of action of the terminal. Dynamic matching includes modifying the parameters of the algorithm during a given identification sequence, from one iteration to the next, as a function of the number of badges actually present in the field of action of the terminal.

Static or dynamic matching can be implemented independently or cumulatively.

It will also be observed that optimizing the process of collision handling (static or dynamic matching) is under the control of the terminal and thus independent of the badges, which can thus be used equally well in circumstances and environments that are very different.

Thus, the same badge can be used without modification of its own settings both with terminals having "handsfree" type readers (e.g. for passing through an inspection gate) where a large number of badges may be present simultaneously within the field of action of the terminal, typically as many as 8 to 10 badges simultaneously, and with terminals having "voluntary act" type readers, i.e. where the user is required to bring the badge into a read zone of small size or to press the badge thereagainst, as occurs, for example, when remotely paying for public transport (in which case the typical number of badges that can be present simultaneously is much smaller: close to 2, and only very rarely greater than 3).

SUMMARY

More precisely, the method of the invention comprises the following successive steps: a) the present terminal transmits, to said plurality of badges, general call messages, each including a collision probability modulation parameter; b) each badge conditionally transmits, to the terminal, a general call response message with a probability of less than 100% as a function of the collision probability modulation parameter, each general call response message containing an identifier specific to the badge; c) on the terminal receiving a general call response message, and in the absence of any collision between the message and a message transmitted by another badge, a specific data communication link is established between the terminal and the badge and data interchange is continued, returning to step a) for a new iteration; and d) otherwise, the method returns to step a) for a new iteration.

In various advantageous implementations:

- the probability of a general call response message being transmitted is modified on each new consecutive iteration in step c) or d); in particular this probability is decreased on the next iteration following step d) in the event of collision;
- at least within iterations following step d) in the event of a collision subsequent to first transmission of a general call message (GENCALL), the probability modulation parameter is transmitted by the terminal so as to define a probability of less than 100% for transmission of a general call response message by each badge likely to reply;
- the badge produces a pseudo-random value and compares the pseudo-random value with the received probability modulation parameter;
- the probability modulation parameter comprises a first field containing fixed data representative of a predetermined type of terminal, and a second field containing specific data for modulating probability; in step b), the fixed data is subjected to prior comparison with corresponding data contained in the badge; and the random value of step b) is generated and the conditional transmission of step c) is performed only if the prior comparison has also given rise to the result "true";
- in step c), generating a control message comprising both the identifier specific to the badge as received by the terminal in response to the general call, and an unambiguous communications channel number; sending said control message from the terminal to the badge; and then continuing the data interchange on the channel allocated in this way; advantageously, when a badge is found to be simultaneously in the fields of action of a plurality of terminals, the channel number includes a data item specific to the terminal which has established a link with the badge, the data item differing between adjacent terminals;
- the probability modulation parameter is a parameter that is modifiable dynamically from one general call message to the next; the terminal includes means operative in step d) to discriminate between the absence of any general call response message being received and a non-compliant message being received, particularly in the event of collision between messages transmitted by two different badges; in step d), in the presence of a non-complaint message, the probability modulation parameter is modified before returning to step a), with the modification being in a direction that decreases the probability of a "true" result being obtained in the subsequent step b); and in step d), in the absence of the terminal receiving a general call response message, the probability modulation parameter is modified prior to returning to step a) in a direction that increases the probability of obtaining a "true" result in the subsequent step b); and

- after each comparison of step b), the badge counts the number of consecutive "false" results produced in response to the same series of general call messages transmitted by the terminal, and forces a response message to be transmitted to the general call whenever the corresponding count has reached a predetermined threshold, even when the protocol defined by the probability modulation parameter requires a random response.

BRIEF DESCRIPTION OF THE DRAWINGS

Other advantages and characteristics of the invention will appear on reading the following description of an embodiment given with reference to the accompanying drawings.

DETAILED DESCRIPTION

Figure 1:
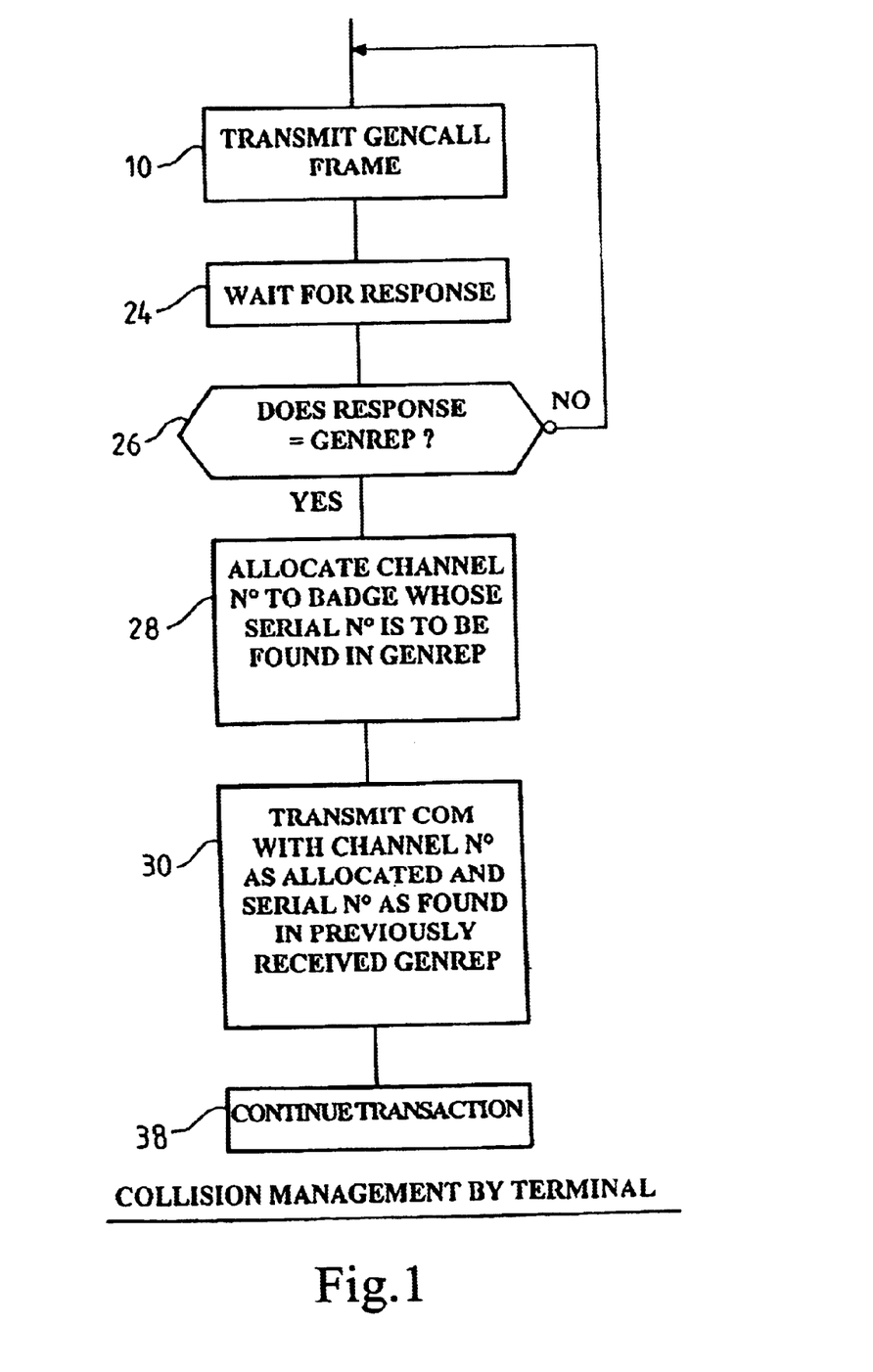
FIG. 1 shows the collision handling algorithm at the terminal end.
Figure 2:
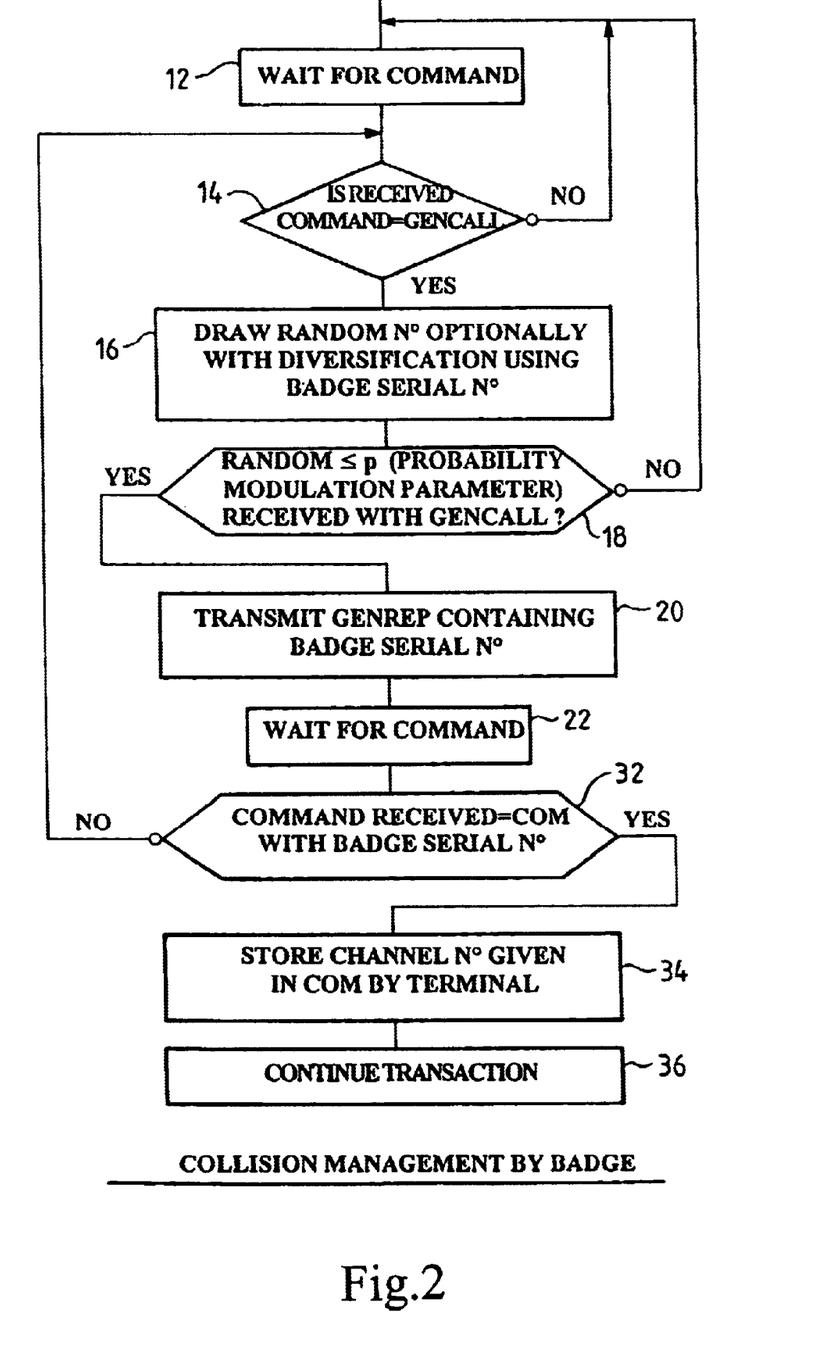
FIG. 2 shows the corresponding algorithm at the badge end.

There follows a description of an implementation of the invention given with reference to the flow charts of FIG. 1 (steps performed at the terminal end) and FIG. 2 (steps performed at the badge end).

These algorithms correspond to a first implementation of the method of the invention for handling collisions, and variants are described below that enable the method to be further improved.

The invention is based on using a parameter referred to below as the "probability modulation parameter" or PMP which is generated by the terminal and which is used as an input value to a probability algorithm implemented by each of the badges in order to cause a response signal to be transmitted or not transmitted in a random manner in response to an interrogation from the terminal.

This parameter which serves to enable the terminal to modulate the probability of badges responding is a parameter that can be matched statically and/or dynamically. In the implementation described below, the only case taken into consideration is that of a parameter which is matched statically, i.e. a parameter which is adjusted as a function of the shape of the terminal and its environment, the parameter varying from one terminal to another but remaining constant over time (below, when describing additional and variant implementations, the case is also described of a parameter that can be matched dynamically over time).

PMP has two fields, namely: a field containing fixed data representative of a predetermined type of terminal, and a field specifically for modulating probability.

The first field indicates, for example, that the terminal is a terminal for controlling access to a zone, a terminal for remotely paying a road toll, a terminal for remotely paying for public transport in a town, etc. This field makes it possible, when a user has a plurality of similar badges (e.g. several contactless badges in the same wallet), to discriminate between different badges corresponding to different transactions, and simultaneously preventing the other badges from inaccurately replying and interfering in a transaction. In the description below, it is assumed that this field is compared to see whether it is identical with a corresponding field in the badge, and that a match has indeed been found (for example, that the interrogating terminal is a terminal giving access to the Paris metro and that the badge is a badge for paying for rides on the Paris metro), and that in all other cases any transmission of a response message by the badge is systemically inhibited.

The mechanism whereby the terminal identifies the badges begins by the terminal transmitting a "general call" frame GENCALL containing, amongst other things, the above-defined PMP.

This GENCALL frame is received simultaneously by the various badges that are present in the field of action of the terminal. On detecting that the received frame is indeed a general GENCALL (step 14, FIG. 2), these various badges, which were in a position of waiting for a command (step 12, FIG. 2), will then decide, in application of a probabilistic algorithm, whether or not to respond to this call.

The corresponding step (step 16, FIG. 2) includes drawing a random number using a conventional algorithm, optionally diversified using the serial number of the badge (the serial number is always quite long and makes it possible to obtain a pseudo-random draw using means that are very simple).

A comparison is then formed (step 18, FIG. 2) between the random number as drawn and the PMP included in the received GENCALL message. The criterion may, for example, be that the random number is less than or equal to the value p of PMP.

By way of example, if PMP can be set to have any one of 64 different values in the range p=0 to p=63, then the random number drawn be a number in the range 0 to 63. It can thus be seen that if the value of PMP is set to p=63, then the probability of a reply will be at a maximum of 100%, whereas if PMP is set to p=0, then the probability of a reply will be 1/64th, i.e. about 1.56%, which is its minimum value. The particular value p for PMP that is sent to the badge therefore determines the probability with which a badge response will be triggered in a range between a minimum value and a maximum value.

If such a response message to the general call, or GENREP, is indeed transmitted (step 20, FIG. 2), then it contains the serial number of the badge which is a unique number making it possible to identify the badge in question without ambiguity so that the terminal can identify it amongst the others (more precisely, this field contains a serial number within the strict meaning of the term "serial", together with a manufacturer number). The badge then waits for a command message (step 22, FIG. 2).

The terminal switches over to receive mode while waiting for a response (step 24, FIG. 1), and on receiving the response, it verifies (step 26, FIG. 1) that the received response is indeed formally a response of the above-specified GENREP type. If so, that means that there has been no collision and that the badge can be identified unambiguously so its serial number can be extracted by decoding the received response GENREP.

Otherwise, the response is ignored and the algorithm returns to step 10 to reiterate transmitting a general call GENCALL (optionally with a change of PMP, as explained below). It should be observed that this situation can correspond either to a collision (a response is received but it is not compliant), or to a lack of response; it is explained below that in some situations it can be advantageous to distinguish between those two cases specifically in order to modify PMP when repeating the general call GENCALL.

If a compliant response is received, then the terminal allocates a channel number (step 28, FIG. 1) to the badge whose serial number is contained in GENREP, thereby making it possible subsequently to continue interchanging data in a simplified manner over that channel (the channel amounts to a short identifier, typically occupying a single byte, and constitutes a short code for accelerating data interchange so that it is no longer necessary for the terminal to transmit the full identification number of the badge). If there are several terminals whose ranges of action overlap, then precautions are taken to ensure that the channel number includes the identity of the terminal processing the response from the badge so as to ensure that the terminal can be identified unambiguously amongst the various terminals with which the badge is physically capable of communicating, thereby preventing a badge receiving commands that are ambiguous.

The terminal then transmits a command message COM (step 30, FIG. 1) containing the allocated channel number and the serial number of the badge, i.e. the number contained in the response GENREP that has just been received.

On receiving such a command COM (step 32, FIG. 2), the badge verifies that it is in compliance, i.e. that it is genuinely intended for the badge, and if that is the case, it stores the channel number that has been allocated thereto and transmitted in the command COM (step 34, FIG. 2). The transaction then continues (step 36, FIG. 2), e.g. by a positive acknowledgment of receipt being transmitted and then transmitting various items of data for processing by the terminal (step 38, FIG. 1), in a manner that is itself known. After receiving an "end" command, the badge then remains silent until it has left the field of action of the terminal and/or until a predetermined duration has elapsed, e.g. by forcing to zero the probability of a GENREP being transmitted in response to a subsequent GENCALL. This is to ensure that the data interchange is not repeated even on receiving a subsequent GENCALL message transmitted by the terminal which is continuing to request GENREP responses from other badges or from badges that have subsequently moved into its field of action.

Figure 3:
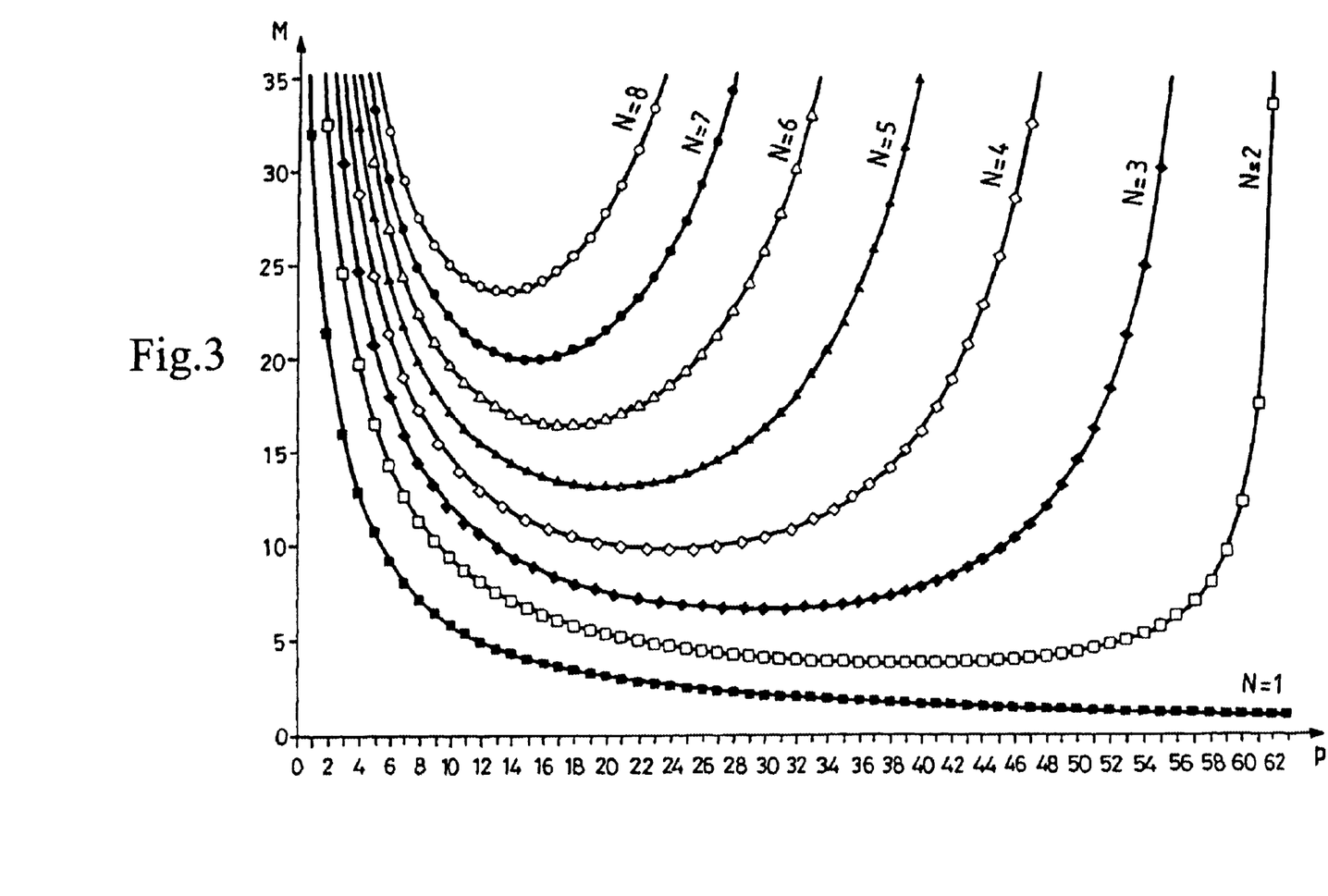
FIG. 3 is an efficiency plot showing the results obtained by the method of the invention and the way in which operation thereof is optimized.

FIG. 3 is a curve showing the effectiveness of the collision handling mechanism of the present invention.

This figure gives the mean number M of attempts that are required to establish contact (i.e. the number of times the algorithm of FIG. 1 is repeated or the number of successive GENCALL frames that need to be transmitted) in order to identify all of the badges present, as a function of the value p of PMP and of the number N of badges simultaneously present in the field of action of the terminal.

In this example, PMP can be set to any value in the range 0 to 63, giving rise to the probability of a badge sending a response that is equal to (p+1)/64, i.e. that lies in the range 1/64 (1.56%) to 1 (100%).

When N=1, it is naturally advantageous for E to have its maximum value (if p=63, then the probability is 100%, and M=1), since there is no risk of collision.

However, when N>1, it can be seen that the optimum value for M, i.e. the minimum of the characteristic corresponding to the number N of badges present, occurs at a value of p which is intermediate between 0 and 63, with the optimum intermediate value decreasing with increasing number of badges.

It can also be seen that for a given value p of PMP, the mean number of attempts required increases as a function of the number of badges present. In other words, the time needed to identify all of the badges decreases with decreasing number of badges, with the system thus matching itself to the number of badges actually present at the same time.

Various improvements and variants can be imagined.

Thus, instead of having a PMP whose value p is set once and for all for a given terminal (as in the example described above), it is possible to cause the value p to vary dynamically as a function of the responses received and the large or small number of collisions detected.

More precisely, in step 26 (FIG. 1), the terminal can have means that respond by discriminating between receiving a non-compliant response indicative of a collision and the case of receiving no response. Providing the electromagnetic environment of the terminal is not excessively disturbed, such discrimination can be achieved in practice by means of a threshold that acts as a silence detector.

Initially, PMP is given its maximum value (63 in the example under consideration), i.e. giving response a probability of 100%.

After a first general call GENCALL has been transmitted, if a collision is detected, i.e. if a response is indeed received but that response is not in compliance, then the terminal causes the value p of PMP to decrease (e.g. by dividing it by 2), the decrease being limited by a floor value deduced from the effectiveness characteristic of FIG. 3.

A new general call is transmitted with PMP reduced in this way, and so on.

Conversely, if a general call GENCALL is followed by no response being received (no badge or badges only at extreme range), then the value p of PMP is increased so as to increase the probability of receiving a response from the next badge to penetrate into the field of the terminal.

The terminal thus operates by dynamically modulating PMP to reduce the probability of a response being made to the next general call sent out to the badges when they are numerous (collisions are detected) and, conversely, to restore the probability to a high value after all of the badges have been identified or after they have left the field of action of the terminal.

In the example described, the probability of a response is a linear function of PMP. In an advantageous variant, when the number of badges is such that the risk of collision is high, then the probability is a decreasing function of PMP, with the decrease being faster than a linear decrease, for example it may be an exponential relationship. Under such circumstances, when the risk of a collision is high and on receiving a first GENCALL signal, it can be preferable for the badges to begin with the minimum probability of response and subsequently to increase it in the absence of collision.

In another variant, this time implemented at the badge end, the badge stores the number of GENCALL frames it receives in succession and to which it has not responded by transmitting a GENREP message, i.e., in other words, the number of successive times the comparison at step 18 (FIG. 2) has given rise to a negative result. When this total exceeds a predetermined threshold (e.g. ten times), then transmission of a GENREP message on next reception of a GENCALL message is forced, regardless of the random number drawn after receiving the GENCALL command. The counter of successive GENCALL commands received is then naturally reset to zero.

This ensures that whatever the circumstances and whatever the value of PMP, a GENREP response is always transmitted within a given time interval (e.g. eleven times the period with which GENCALL frames are sent in the above example) by all of the badges that are simultaneously present in the field of action of the terminal.

Other variants are also possible, for example in which the badges store historical data, and the terminal transmits a reinitialization signal for ensuring a selective response from the badges as a function of the stored history, such that some badges do not reply and/or others necessarily reply.

What is claimed is:

1. For use in a system of interchanging data between a plurality of portable objects and at least one data transceiver terminal suitable for cooperating with portable objects simultaneously present in a field of action of the terminal, the terminal comprising circuitry configured to perform the following:

store a collision probability modulation parameter (PMP), the value of which is a function of a mean number of said portable objects likely to be found in a field of action of said terminal;

transmit a general call message to the portable objects, the general call message including said PMP;

receive a general response message from each of the portable objects determined to respond to the general call message, each of the general response messages including an identifier uniquely identifying the respective portable object transmitting the general response message;

in the absence of a collision between the general response messages of portable objects, establish a specific data communication link between the terminal and each portable object transmitting the general response message, respectively; and determine a collision has occurred between the general response messages of portable objects when the general response message is not received from any of the portable objects and transmit the general call message again.

2. The terminal of claim 1, wherein the circuitry is configured to modify the probability modulation parameter of before the general call response message is transmitted again.

3. The terminal of claim 2, wherein the circuitry is configured to decrease the probability modulation parameter when a collision is determined.

4. The terminal of claim 1, wherein when a collision is determined, the circuitry is configured to modify the probability modulation parameter so that the probability of any of the portable objects transmitting the general call response message is less than 100%.

5. A system where data is interchanged between a plurality of portable objects and a data transceiver terminal suitable for cooperating with the plurality of portable objects simultaneously present in a field of action of the terminal, comprising:

means for setting in the terminal a collision probability modulation parameter (PMP), the value of which is a function of a mean number of said portable objects likely to be found in a field of action of said terminal;

means for transmitting a general call message from the terminal to the portable objects, the general call message including said PMP set in the terminal;

means for determining which portable objects will respond to the general call message based on the PMP;

means for transmitting a general response message by each portable object determined to respond to the general call message, each of the general response messages including an identifier uniquely identifying the respective portable object transmitting the general response message;

upon the one terminal receiving the general call message and the absence of a collision between the general response messages of portable objects, means for establishing a specific data communication link between the one terminal and each of the plurality of portable objects transmitting the general call message;

wherein when the terminal determines at least one of a collision between the general response messages of portable objects and not receiving the general call message from any of the plurality of objects, the means for transmitting is configured to transmit another subsequent general call message.

6. The system of claim 5, further comprising:

means for modifying the probability of the general call response message being transmitted.

7. The system of claim 5, further comprising:

means for decreasing the probability of the general call response message being transmitted in an event of a collision.

8. The system of claim 5, each of the portable objects comprising:

means for producing a pseudo-random value and comparing said pseudo-random value with the received probability modulation parameter.

9. The system of claim 8, wherein the probability modulation parameter includes a first field containing data representative of a predetermined type of terminal, and a second field containing data for modifying the probability modulation parameter.

10. The system of claim 5, the terminal further comprising:

means for generating a control message (COM) including the identifier specific to the respective portable object, as received by the terminal in response to the general call message, and a communications channel number;

means for sending said control message from the terminal to the respective portable object and continuing a data interchange on the channel identified by the communications channel number.

11. The system of claim 10, further comprising:

a plurality of terminals, wherein the channel number includes a data item specific to the terminal which established a link with the portable object, said data item differing between adjacent ones of the terminals.

12. The system of claim 5, wherein the probability modulation parameter is dynamically modifiable from one general call message to another subsequent general call message.

13. The system of claim 5, wherein the plurality of portable objects are badges.

14. A method of controlling collisions in a system of interchanging data between a plurality of portable objects and at least one data transceiver terminal suitable for co-operating with the plurality of portable objects simultaneously present in a field of action of the at least one terminal, the method comprising the following steps:

a) setting in the terminal a collision probability modulation parameter (PMP), the value of which is a function of a mean number of said portable objects likely to be found in a field of action of said terminal;

b) transmitting a general call message from the at least one terminal to the plurality of portable objects, the general call message including said PMP set in the terminal;

c) receiving a general response message from each of the plurality of portable objects determined to respond to the general call message, each of the general response messages including an identifier uniquely identifying the respective portable object transmitting the general response message;

d) upon the at least one terminal determining the general response message and the absence of a collision between the general response messages of portable objects, establishing a specific data communication link between the at least one terminal and each of the plurality of portable objects transmitting the general response message, respectively, and repeating steps b) through d), for a new iteration;

e) upon the at least one terminal determining at least one of a collision between the general response messages of portable objects and not receiving the general response message from any of the plurality of objects, repeating steps (b) through (e) for a new iteration.

15. The method of claim 14, wherein the probability modulation parameter of the general call response message being transmitted is modified on each new consecutive iteration.

16. The method of claim 15, wherein the probability modulation parameter of the general call response message being transmitted is decreased in an event of a collision on the respective new iteration.

17. The method of claim 14, wherein at least within iterations following step d in an event of a collision subsequent to a first transmission of the general call message, the probability modulation parameter is transmitted by the at least one terminal so as to define the probability of less than 100% for transmission of the general call response message by any of the plurality of portable objects.

18. A method of controlling collisions in a system of interchanging data between a plurality of portable objects and at least one data transceiver terminal suitable for co-operating with the plurality of portable objects simultaneously present in a field of action of the at least one terminal, the method comprising the following steps:

a) setting in the terminal a collision probability modulation parameter (PMP), the value of which is a function of a mean number of said portable objects likely to be found in a field of action of said terminal;

b) transmitting a general call message from the at least one terminal to the plurality of portable objects, the general call message including said PMP set in the terminal;

c) determining which ones of the plurality of portable objects will respond to the general call message based on the PMP;

d) transmitting a general response message by each of the plurality of portable objects determined to respond to the general call message, each of the general response messages including an identifier uniquely identifying the respective portable object retransmitting the general response message;

e) upon the at least one terminal receiving the general response message and the absence of a collision between the general response messages of portable objects, establishing a specific data communication link between the at least one terminal and each of the plurality of portable objects transmitting the general response message, respectively, and repeating steps b) through e), for a new iteration;

f) upon the at least one terminal determining at least one of a collision between the general response messages of portable objects and not receiving the general response message from any of the plurality of objects, repeating steps b) through f) for a new iteration.

19. The method of claim 18, wherein the probability of the general call response message being transmitted is modified on each new consecutive iteration in at least one of step e) and f).

20. The method of claim 19, wherein the probability of the general call response message being transmitted is decreased in an event of a collision on the respective new iteration following step f).

21. A method of claim 18, wherein at least within iterations following step f in an event of a collision subsequent to a first transmission of the general call message, the probability modulation parameter (PMP) is transmitted by the at least one terminal so as to define the probability of less than 100% for transmission of the general call response message by any of the plurality of portable objects.

22. The method of claim 21, wherein when the respective portable object receives the probability modulation parameter (PMP), the respective portable object produces a pseudo-random value and compares said pseudo-random value with the received probability modulation parameter.

23. The method of claim 22, wherein:
the probability modulation parameter includes a first field containing fixed data representative of a predetermined type of terminal, and a second field containing specific data for modulating the probability;
in step c), the fixed data is subjected to a prior comparison with corresponding data contained in the respective portable object; and
the pseudo-random value is generated and the transmission by any of the plurality of portable objects of the general response message of step d) is performed only if the prior comparison has also given rise to a "true" result.

24. The method of claim 18, wherein in step e), establishing the specific link includes:
generating a control message (COM) including both the identifier specific to the respective portable object as received by the at least one terminal in response to the general call message, and an unambiguous communications channel number;
sending said control message from the at least one terminal to the respective portable object, and
continuing the data interchange on the channel.

25. The method of claim 24, wherein for a portable object simultaneously in the fields of action of a plurality of terminals, the channel number includes a data item specific to the respective terminal which has established the link with the respective portable object, said data item differing between adjacent terminals.

26. The method of claim 18, wherein:
the probability modulation parameter is a parameter that is dynamically modifiable from one general call message to a subsequent general call message;
the at least one terminal includes means operative in step f) to discriminate between an absence of the general call response message being received and a non-compliant message being received, particularly in an event of a collision between general response messages transmitted by different portable objects;
in step f), in a presence of a non-compliant message, the probability modulation parameter is modified before returning to step b), with the modification decreasing the probability of a "true" result being obtained in the subsequent step c), and
in step e), in the absence of the at least one terminal receiving the general call response message, the probability modulation parameter is modified prior to returning to step b) increasing the probability of obtaining a "true" result in the subsequent step c).

27. The method of claim 18, wherein after each comparison of step c), the respective portable object counts a number of consecutive "false" result produced in response to the respective general call messages transmitted by the at least one terminal, and forces a response message to be transmitted to the respective general call message whenever a corresponding count has reached a predetermined threshold, even when a protocol defined by the probability modulation parameter requires a random response.

28. A The method of claim 18, wherein the plurality of portable objects are badges.

* * * * *